(12) United States Patent
Pinier et al.

(10) Patent No.: US 7,676,290 B2
(45) Date of Patent: Mar. 9, 2010

(54) METHOD FOR REMOTELY EVALUATING THE AUDIO QUALITY OF AN IP TERMINAL AND CORRESPONDING TERMINAL

(75) Inventors: François Pinier, Strasbourg (FR); Pierre Hammann, Erstein (FR)

(73) Assignee: Alcatel, Paris (FR)

( * ) Notice: Subject to any disclaimer, the term of this patent is extended or adjusted under 35 U.S.C. 154(b) by 1846 days.

(21) Appl. No.: 10/318,253

(22) Filed: Dec. 13, 2002

(65) Prior Publication Data

US 2003/0135815 A1    Jul. 17, 2003

(30) Foreign Application Priority Data

Jan. 11, 2002    (EP) .................................. 02360022

(51) Int. Cl.
*G06F 17/00*    (2006.01)
*H04J 1/16*    (2006.01)
*H04L 12/66*    (2006.01)

(52) U.S. Cl. ............................. 700/94; 381/56; 370/252

(58) Field of Classification Search ................... 381/56; 700/94; 370/252
See application file for complete search history.

(56) References Cited

U.S. PATENT DOCUMENTS 6,134,680 A * 10/2000 Yeomans ..................... 714/57

| | | | |
|---|---|---|---|
| 6,275,797 B1 * | 8/2001 | Randic | 704/233 |
| 6,496,196 B2 * | 12/2002 | Shiga | 345/629 |
| 6,741,569 B1 * | 5/2004 | Clark | 370/252 |
| 7,046,636 B1 * | 5/2006 | Shaffer et al. | 370/252 |
| 7,280,487 B2 * | 10/2007 | Goodman | 370/252 |

FOREIGN PATENT DOCUMENTS

| | | |
|---|---|---|
| EP | 0 693 861 A2 | 1/1996 |
| EP | 0 855 824 A2 | 7/1998 |
| GB | 2 275 848 A | 9/1994 |
| WO | WO 01/80492 A2 | 10/2001 |

* cited by examiner

*Primary Examiner*—Xu Mei
(74) *Attorney, Agent, or Firm*—Sughrue Mion, PLLC

(57) ABSTRACT

The present invention concerns a method for remotely evaluating and/or checking the audio quality of an Internet Protocol based voice communication terminal and a corresponding terminal. Method mainly comprising the steps of providing an IP based terminal with an audio device able to perform measurement and computation on at least some of the digital and/or analog voice signals delivered and/or transmitted within said IP communication terminal, connecting a control terminal to the network to which said IP communication terminal is connected to, retrieving at the control terminal the results of measurement and computation operations of at least one audio quality parameter performed by said device.

10 Claims, 1 Drawing Sheet

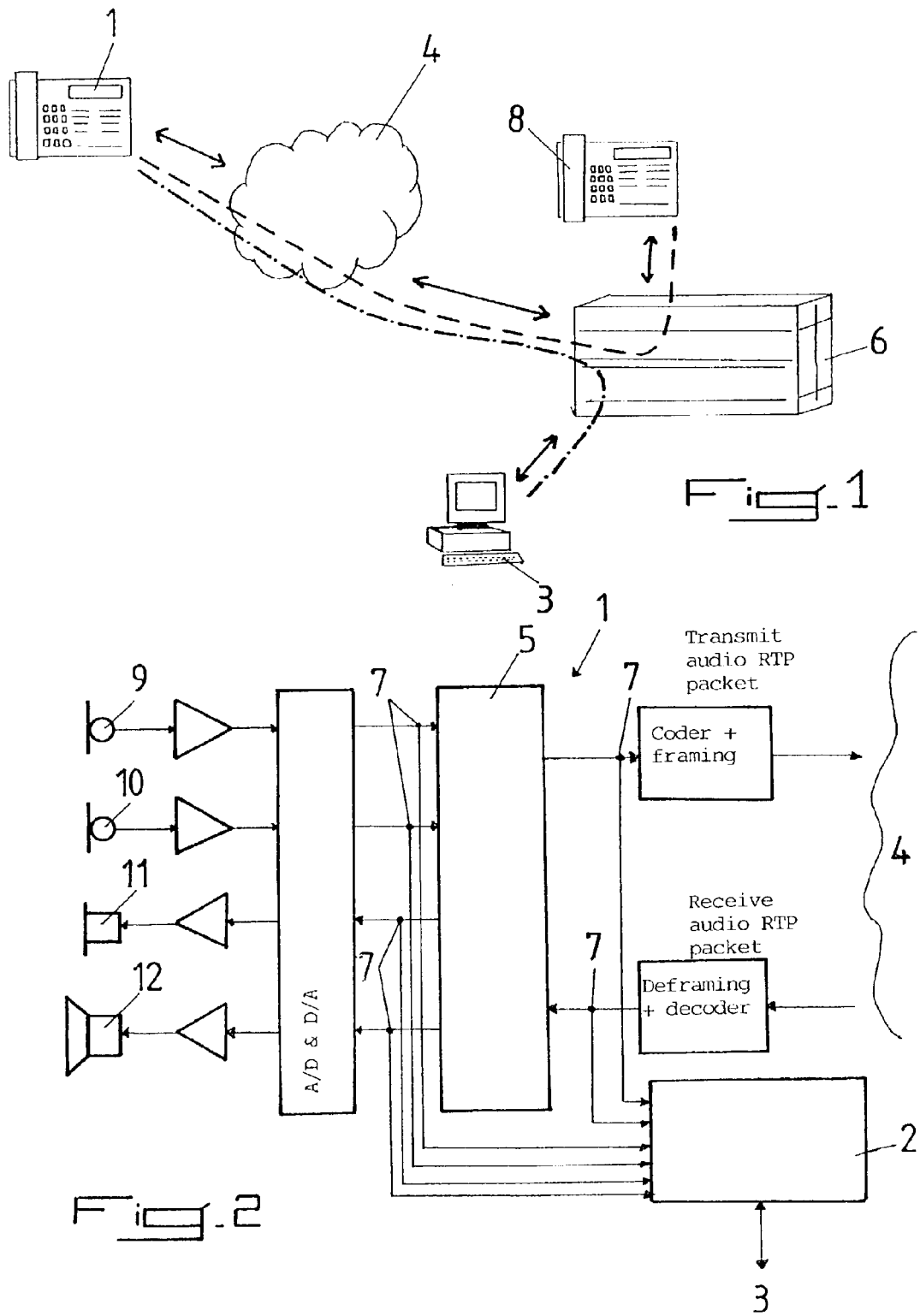

METHOD FOR REMOTELY EVALUATING THE AUDIO QUALITY OF AN IP TERMINAL AND CORRESPONDING TERMINAL

TECHNICAL FIELD

The present invention concerns generally Internet Protocol (IP) based communication systems, in particular regarding the audio quality issues, and more precisely a method for remotely evaluating the audio quality of an IP communication terminal, and also a corresponding terminal. The invention is based on a priority application EP 02 360 022.4 which is hereby incorporated by reference.

BACKGROUND OF THE INVENTION

At present, more and more IP based sound or voice communication terminals, such as IP phones, use complex vocoder algorithms, like for example ITU-T G.711, G.723.1 or G.729.

Using such algorithms incorporating silence suppression mechanism in association with traditional audio functions (handsfree, digital gains, clipping mechanism, automatic gain control), performed by digital signal processors, can lead to major audio quality problems depending on the user voice (loud or whispered) and on the user environment (noisy or calm).

Nowadays, when a user or customer experiences bad audio quality in his communications and complains about it, the only available solution is to send a qualified expert on site in order to perform audio measurements (like electrical levels of signals from microphones and to earpiece and loudspeaker) with an adapted device.

Nevertheless, this existing solution is not seamless for the customer, as during the measurement session at least the concerned IP communication terminal is not available for the corresponding user.

Furthermore, if these audio quality problems have occurred on several terminals of the customer's premises, then the customer's telecommunication system itself might not be available.

In addition, the expert will have to go with his measuring device in each office or to each place equipped with a faulty terminal. The repetitive interventions take a lot of time and can cause major disturbances in the customer's activity.

The problem to be solved by the invention is to propose a method which allows test measurements of audio quality parameters of IP telecommunication terminals without interfering with the normal use of said terminals.

Said method should also increase productivity and efficiency of the support teams or expert teams, by reducing the service time and by rendering the measurements operations less tiresome.

SUMMARY OF THE INVENTION

Therefore, the present invention concerns a method for remotely evaluating and/or checking the audio quality of an Internet Protocol (IP) based at least voice communication terminal, characterised in that it mainly comprises the steps of providing an IP based terminal with an audio device able to perform measurement and computation on at least some of the digital and/or analog voice signals delivered and/or transmitted within said IP communication terminal, connecting a control terminal to the network to which said IP communication terminal is connected to, retrieving at the control terminal the results of measurement and computation operations of at least one audio quality parameter performed by said device.

According to a first embodiment of the invention, said measurement and computation operations are performed automatically by said audio device while said IP communication terminal is in use.

According to a second embodiment of the invention, said measurement and computation operations are performed by said audio device under the remote control of the control terminal, while said IP communication terminal is in use.

Preferably, the root control terminal communicates with and operates the audio device via a so-called Telnet or tn protocol connection.

Thus, the basic idea of the invention consists, for example in connection with IP technology based phone, in embedding, using IP technology, a current audio device inside all newly sold or updated phones. In case of problem, an expert will then be able to perform all the needed measurements over a network from a root terminal using an adapted protocol, advantageously Telnet, to fully control each IP phone.

Of course, the measurement and computation operations can be easily performed on several IP communication terminals connected to the same network and the results retrieved sequentially by the control terminal over said network.

BRIEF DESCRIPTION OF THE DRAWINGS

This invention will be better understood thanks to the following description explaining a preferred embodiment of the invention as a non limitative example, in connection with the enclosed schematical drawings.

FIG. 1 is a schematical representation showing the implementation of the method of the invention in a telecommunication system comprising an IP-LAN and an IP-PABX.

FIG. 2 is a partial view of the structure of an IP communication terminal according to the invention.

DETAILED DESCRIPTION OF A PREFERRED EMBODIMENT

The inventive method mainly comprises the steps of providing an IP based terminal 1 with an audio device 2 able to perform measurement and computation on at least some of the digital and/or analog voice signals delivered and/or transmitted within said IP communication terminal 1, connecting a control terminal 3 to the network 4 to which said IP communication terminal 1 is connected to, retrieving at the control terminal 3 the results of measurement and computation operations of at least one audio quality parameter performed by said device 2.

The root control terminal 3 communicates with and operates the audio device 2 via a so-called Telnet or tn protocol connection.

The embedded device 2 is advantageously able to perform, possibly after reception of a corresponding request from the control terminal 3, computations of the audio signal(s) parameters or levels selected within the group consisting of average value, R.M.S. value, positive peak value and negative peak value.

As can been seen on FIG. 2, by looking at the measurement points 7, the measured and computed audio signals are digital signals entering or exiting the digital signal processing unit 5 of the concerned IP communication terminal(s) 1.

The invention will now be described more precisely in relation with FIGS. 1 and 2 of the drawings, which show an enterprise telecommunication system wherein the network 4 is an IP based Local Area Network (IP LAN) and wherein the control terminal 3 can be connected to said network 4 through an IP-PABX 6.

On these figures, the terminal 1 is an IP phone and the control terminal 3 is a PC.

Referring to FIG. 1, one can assume that the IP phone 1 is currently in communication with a legacy phone 8 through the evenly dashed path crossing the IP LAN network 4 and the IP-PABX 6.

In case of potential audio problems inside the IP phone 1 (following a customer complain on this type of connection), the expert can perform audio measurements from a remote control terminal 3 via a basic Telnet connection on the TCP/IP protocol stack as it is shown by the unevenly dashed path.

The embedded audio device 2 in the IP phone 1 is able to perform, as requested by the remote terminal 3, computations of the following audio signal levels:
  Average value,
  R.M.S. value,
  Positive peak value,
  Negative peak value.

Referring to FIG. 2, these previous computations could be done at the following observation or measurement points 7:
  Signal from microphones 9 and 10 (handset and handsfree),
  Signal toward earpiece 11 of handset,
  Signal toward loudspeaker 12,
  Signal toward coder algorithm (ITU-T G.711, G.723.1 or G.729) before RAP packet sending,
  Signal from decoder algorithm (ITU-T G.711, G.723.1 or G.729) after RAP packet receiving.

The present invention also concerns a communication terminal able to be evaluated and/or checked through the method described before. According to the invention, said terminal 1 is an IP based voice or voice/data communication terminal which includes an audio device 2 connected to several measurement points 7 in order to detect predetermined levels of the audio signals transmitted inside the IP communication terminal 1 from the user side towards the network side and from the network side towards the user side, before and after said audio signals have been subjected to treatment by the signal processing means 5 of said IP communication terminal 1 (FIG. 2).

This audio device 2 could for example consist of a software sub-program embedded in the core program running on the digital signal processing unit 5.

Said audio device 2 includes means to perform computations of the audio signals parameters or levels selected within the group consisting of average value, R.M.S. value, positive peak value and negative peak value and said audio-device 2 is able to be remotely controlled through a Telnet ot tn protocol connection.

The present invention is, of course, not limited to the preferred embodiments described herein and showed on the attached drawings, changes can be made or equivalents used without departing from the scope of the invention.

The invention claimed is:

1. Method for remotely evaluating or checking the audio quality of an Internet Protocol based IP communication terminal, comprising:
  providing the IP communication terminal with an audio device able to perform measurement and computation operations on at least one of a digital or analog voice signal delivered or transmitted within the IP communication terminal,
  connecting a control terminal to a network to which the IP communication terminal is connected to,
  retrieving at the control terminal the results of the measurement and computation operations of at least one audio quality parameter performed by said audio device,
  wherein said measurement and computation operations are performed before coding and transmitting audio Real Time Protocol (RTP) packets to the network, and after receiving and decoding audio Real Time Protocol (RTP) packets from the network.

2. Method according to claim 1, wherein said measurement and computation operations are performed automatically by said audio device while said IP communication terminal is in use.

3. Method according to claim 1, wherein the measurement and computation operations are performed on several IP communication terminals connected to the same network and the results retrieved sequentially by the control terminal over said network.

4. Method according to claim 1, wherein the audio device is able to perform, possibly after reception of a corresponding request from the control terminal, computations of the audio signal(s) parameters or levels selected within the group consisting of average value, R.M.S. value, positive peak value and negative peak value.

5. Method according to claim 1, wherein the measured and computed audio signals are digital signals entering or exiting the digital signal processing unit of the concerned IP communication terminal(s).

6. Method according to claim 1, wherein the network is an IP based Local Area Network and in that the control terminal is connected to said network through an IP-PABX.

7. Communication terminal able to be evaluated or checked through the method according to claim 1,
  wherein said terminal is an IP based voice or voice/data IP communication terminal which includes an audio device connected to several measurement points in order to detect predetermined levels of the audio signals transmitted inside the IP communication terminal from the user side towards the network side and from the network side towards the user side, before and after said audio signals have been subjected to treatment by the signal processing means of said IP communication terminal.

8. Communication terminal according to claim 7, wherein said
  audio device includes means to perform computations of the audio signals parameters or levels selected within the group consisting of average value, R.M.S. value, positive peak value and negative peak value and that said audio-device is able to be remotely controlled through a Telnet or tn protocol connection.

9. Method according to claim 1, wherein said measurement and computation operations are performed by said audio device under a remote control of the control terminal, while said IP communication terminal is in use.

10. Method according to claim 1, wherein a root control terminal communicates with and operates the audio device via a so-called Telnet or tn protocol connection.

* * * * *